Aug. 18, 1942.  C. D. BUCKLEY  2,293,587
FASTENER ATTACHING MEMBER AND FASTENER INSTALLATION
Filed July 31, 1940
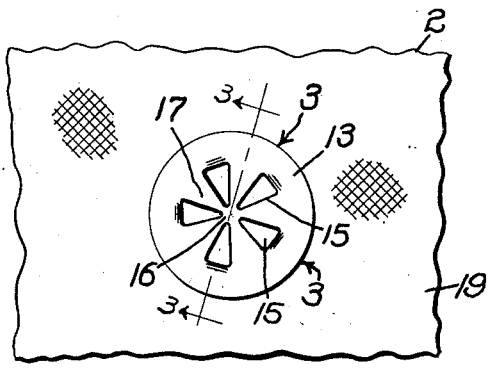
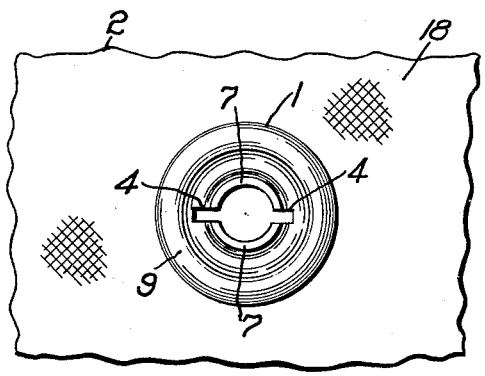
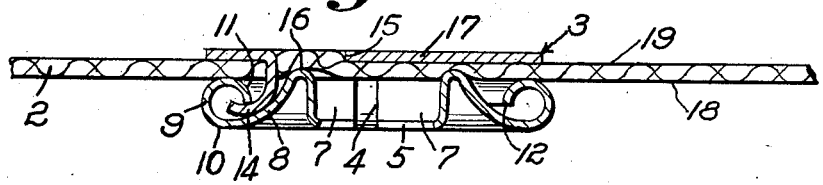
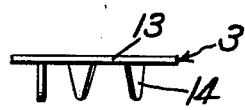
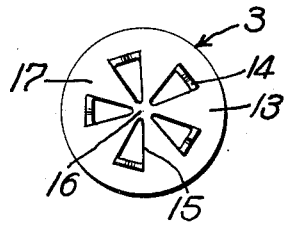
Inventor:
Clyde D. Buckley.
By John Todd
Att'y.

Patented Aug. 18, 1942

2,293,587

UNITED STATES PATENT OFFICE 2,293,587

FASTENER ATTACHING MEMBER AND FASTENER INSTALLATION

Clyde D. Buckley, Needham, Mass., assignor to United-Carr Fastener Corporation, Cambridge, Mass., a corporation of Massachusetts Application July 31, 1940, Serial No. 348,797

1 Claim. (Cl. 24—216)

This invention relates to fastener installations and particularly to attaching members forming a part of the installations.

The chief object of my invention is an improved attaching member for securing a fastener member to a flexible supporting strip. The attaching member is most useful in connection with a fastener of the so-called laundryproof type now being used on shirt front, shorts, dresses and the like. The attaching member is constructed to provide a plate portion engaging the visible surface of a strip and attaching prongs extending from the plate portion through the strip and engaging a fastener member to secure the fastener member to an opposite side of the strip from the plate portion.

The invention aims to provide an improvement over attaching members of the type shown by Fenton, United States Patent No. 2,131,347, which is in the form of a ring having attaching prongs extending from the inner edges thereof. The chief fault of the above-mentioned attaching members, which are now in wide commercial use, results from its ring-shaped construction which permits the strip to project upwardly through the openings of the rings when the attaching members are engaged with the fastening members so as to cause unattractive bulges in the material of the strip. These bulges are particularly undesirable when they appear on exterior garments such as men's shirts as they prevent the shirt front from having a smooth and finished appearance. Furthermore, when the stud is in the socket it bears against the material and constant rubbing on the material through the hole in the ring wears the material.

As a result of my present invention I am enabled to prevent this bulge and wear of the material through the attaching member by constructing the attaching member in an improved manner so as to provide a plate portion having attaching prongs cut therefrom in a way to leave sufficient material of the plate portion in engagement with a side of the strip so as to prevent the strip from projecting through the plate portion. At the same time the plate portion, which is normally the most visible part of the fastener, presents a neat and attractive appearance.

The full nature of my invention, as well as other objects and uses thereof, will be more fully understood from the drawing and specification hereinbelow set forth.

Referring to the drawing, in which I have illustrated a preferred embodiment of my invention:

Fig. 1 is a top plan view of my preferred fastener assembly;

Fig. 2 is a bottom plan view of the assembly shown in Fig. 1;

Fig. 3 is an enlarged sectional view taken along the line 3—3 of Fig. 1;

Fig. 4 is a side elevation of my improved attaching member; and

Fig. 5 is a bottom plan view of the attaching member shown in Fig. 4.

Referring to the drawing, I have shown a stud and socket installation comprising a fastener member, which may be in the form of a socket 1, carried by a supporting part such as a strip of flexible material 2, and an attaching member 3 in cooperative engagement with the fastener 1 to secure the same to the strip. The fastener member 1 may be either a stud or socket member and may take any one of several forms, but I have preferred to show it as a socket member of laundryproof construction providing a barrel portion, which is open at both ends to receive a stud head (not shown). The barrel has a pair of slots 4—4 which extend from the forward end 5 of the barrel toward its rear end 6 dividing the barrel into a pair of similar oppositely disposed resilient portions 7—7. An annular flange portion 8 extends reversely from the rear end 6 of the barrel toward its forward end 5 and outwardly in a sloping formation. A U-shaped annular retainer ring 9 extends reversely from the forward surface 10 of the flange 8 and has its free edge 11 spaced from the surface of the flange 8 so as to leave an annular slot 12 (Fig. 3).

Referring in detail to the attaching member 3, I have shown one comprising a plate portion 13 which is preferably, though not exclusively, circular in shape. Attaching prongs 14 integrally joined to the plate portion 13 at points spaced from the peripheral edge thereof extend outwardly away from the plate portion. The prongs 14 are preferably triangular in shape and tapered toward their outermost free ends whereby the prongs may pass more readily through the supporting strip. The prongs 14 are preferably arranged in an annular series so as to engage with the socket member at different points around the body of the same. The plate portion 13 has a series of triangular-shaped openings 15, out of which the prongs 14 were pressed by a simple stamping operation. The openings 15 are preferably arranged in symmetrical form and extend radially from adjacent a central portion or hub 16 (Figs. 1 and 5). The openings 15 are disposed entirely within the marginal edges of the plate portion 13 and are spaced one from another so as to leave substantially triangular-shaped portions 17 therebetween which engage the upper surface of the strip 2, when the parts of the installation are in final assembly, for a purpose to be described.

In assembly of the parts, the prongs 14 are projected through the supporting part 2 against the sloping flange 8 of the socket member, by which they are turned into the retainer ring 9. Thus the socket member is secured in firm attachment to the strip 2 against the lower side 18 of the strip and the plate portion 13 is disposed in abutting relation to the upper side 19 of the strip. It will be seen from inspection of Fig. 3 that when the parts are in final assembly, there is a tendency for the socket member to press the strip 2 toward the plate portion 13. With attaching members now in commercial use, which provide a ring-shaped portion, as hereinabove mentioned, the strip will project through the opening of the ring causing, in many cases, an unattractive bulge in the material of the supporting part. As a result of the construction of my present invention, the portions 17 of the plate portion abut the upper side 19 of the strip and prevent the strip from being pressed through the plate portion. Thus, the strip presents a substantially smooth and flat upper side and at the same time the plate portion of the attaching member, by reason of the symmetrical formation of the openings 15, has a pleasing appearance to the eye. Furthermore (and the following is important), my attaching member is stronger and more durable than known types and particularly adaptable to withstanding the forces to which it may be subjected during washing and ironing of a garment.

Although I have illustrated and described a preferred embodiment of my invention, I do not wish to be limited thereby because the scope of my invention is best defined by the following claim.

I claim:

In combination with a flexible fabric strip and a fastener member formed with a central stud-receiving socket open at both ends and a surrounding annular U-shaped retainer ring for attachment to one face thereof; of an attaching member for securing said fastener member to said strip comprising a single thickness annular plate disposed flatwise against a surface of said strip opposite the fastener member, and an annular series of prongs cut from and integrally joined to said plate at points spaced between the center and outer peripheral edge of the plate; the length of said prongs being substantially less than the distance between the center of the plate and point of attachment of the prongs thereto providing a central solid hub in said plate disposed in the plane of the plate and in engagement with the fabric strip, for maintaining the body of the fabric strip within the peripheral edge of the plate flat and relatively free from bulges, said prongs being insertable through the fabric strip and into the annular retainer ring of the fastener member and clenched therein for securing the attaching member, fastener member and strip in fixed relation, the central solid hub portion of the plate covering and reinforcing the fabric strip axially over the open upper end of the central stud-receiving socket in the plane of the marginal edge portions of the plate.

CLYDE D. BUCKLEY.